(12) United States Patent
Sheikhrezai

(10) Patent No.: US 7,834,477 B2
(45) Date of Patent: Nov. 16, 2010

(54) WIND ENERGY SYSTEM WITH WIND SPEED ACCELERATOR AND WIND CATCHER

(75) Inventor: Reza J. Sheikhrezai, Menlo Park, CA (US)

(73) Assignee: Windation Energy Systems, Inc., Menlo Park, CA (US)

( * ) Notice: Subject to any disclaimer, the term of this patent is extended or adjusted under 35 U.S.C. 154(b) by 0 days.

(21) Appl. No.: 12/371,251

(22) Filed: Feb. 13, 2009

(65) Prior Publication Data

US 2009/0315332 A1   Dec. 24, 2009

Related U.S. Application Data

(60) Provisional application No. 61/074,034, filed on Jun. 19, 2008.

(51) Int. Cl.
*F03D 9/00*   (2006.01)
*H02P 9/04*   (2006.01)

(52) U.S. Cl. .................................... 290/55; 290/44
(58) Field of Classification Search .............. 290/44, 290/55; 415/4.5, 4.2, 4.3, 2.1, 907; 416/132 B, 416/1, 10, 12, 14
See application file for complete search history.

(56) References Cited

U.S. PATENT DOCUMENTS

| | | | | |
|---|---|---|---|---|
| 3,883,750 A * | 5/1975 | Uzzell, Jr. | | 290/55 |
| 4,057,270 A * | 11/1977 | Lebost | | 290/54 |
| 4,079,264 A * | 3/1978 | Cohen | | 290/55 |
| 4,087,196 A * | 5/1978 | Kronmiller | | 415/4.5 |
| 4,218,175 A * | 8/1980 | Carpenter | | 415/219.1 |
| 4,324,985 A | 4/1982 | Oman | | 290/55 |
| 4,360,315 A | 11/1982 | Olson | | 416/41 |
| 4,684,316 A | 8/1987 | Karlsson | | 415/2 A |
| 5,669,758 A | 9/1997 | Williamson | | 416/4 |
| 5,982,046 A | 11/1999 | Minh | | 290/55 |
| 6,053,700 A | 4/2000 | Fosdick | | |
| 6,246,126 B1 * | 6/2001 | Van Der Veken et al. | | 290/55 |
| 6,249,059 B1 * | 6/2001 | Hosoda | | 290/55 |
| 6,710,468 B1 * | 3/2004 | Marrero O'Shanahan | | 290/55 |
| 6,765,309 B2 | 7/2004 | Tallal, Jr. et al. | | 290/55 |
| 6,981,839 B2 * | 1/2006 | Fan | | 415/4.1 |
| 2003/0178855 A1 * | 9/2003 | Li | | 290/43 |
| 2004/0183310 A1 * | 9/2004 | Mowll | | 290/55 |
| 2005/0012341 A1 | 1/2005 | Roskey | | |
| 2007/0236021 A1 | 10/2007 | Roskey | | |
| 2008/0023964 A1 | 1/2008 | Sureshan | | |
| 2008/0150293 A1 * | 6/2008 | Calhoon | | 290/55 |
| 2008/0315592 A1 * | 12/2008 | Branco | | 290/55 |

* cited by examiner

*Primary Examiner*—Julio C. Gonzalez
(74) *Attorney, Agent, or Firm*—Mark J. Danielson; Pillsbury Winthrop Shaw Pittman LLP

(57) ABSTRACT

The present invention is related generally to power generation, and more particularly, to an apparatus for generating power from wind energy by accelerating winds captured by a wind catcher module. According to a first aspect, a wind energy system comprises a wind turbine and a wind catch opening, in which there is a pressure-gradient force that accelerates the movement of air into the wind catch opening and onto the wind turbine. According to another aspect, a wind energy system comprises a wind turbine and a wind catch module that redirects wind from outside the wind energy system to the wind turbine in a direction substantially perpendicular to the wind turbine. According to yet another aspect, a wind energy system comprises a wind turbine, where the moving parts of the wind turbine are not exposed to humans, birds or other similar sized wildlife during normal operation.

16 Claims, 9 Drawing Sheets

WIND ENERGY SYSTEM WITH WIND SPEED ACCELERATOR AND WIND CATCHER

CROSS-REFERENCE TO RELATED APPLICATIONS

The present application claims priority to U.S. Prov. Appln. No. 61/074,034 filed Jun. 19, 2008, the contents of which are incorporated by reference herein in their entirety.

FIELD OF THE INVENTION

The present invention is related generally to power generation, and more particularly, to an apparatus for generating power from wind energy.

BACKGROUND OF THE INVENTION

Wind energy is abundant, clean, and free. Some 30% of clean energy production capacity in the 15 European Union countries is based on wind energy. For the most part, however, wind energy production has been confined to large wind farms located far from dense human populations, since the large land area needed for wind farms are available outside of cities and urban centers. Moreover, most wind energy systems employ large wind turbines, which in turn require large supporting structures, such as tall towers and increased power grid capacity to deliver the power to the urban environments where people live.

As such, the wind energy systems commonly used today are unsuitable for urban environments. Urban buildings, however, consume over 40% of all power in the world, and being able to convert wind energy into electricity that is usable by urban dwellers will contribute significantly to the increased use of clean energy.

Urban environments pose several problems for traditional wind energy systems. As just discussed, traditional wind energy systems are designed for use in locations that are typically outside of urban centers. Wind farms of traditional wind energy systems located in rural areas also require increased power grid capacity to deliver their generated power to the urban centers. The large size of traditional wind energy systems is unsuitable for urban environments. Also, wind on urban building rooftops is turbulent with random up and down wind currents and rotating wind eddies. Therefore, special systems are needed to take full advantage of such wind energy. Although some wind energy systems have been designed for home use, these require large lots of at least one-half or more acres, which render them unusable in the vast majority of homes and commercial buildings in the urban centers of the world. Finally, wind energy systems in urban environments need to operate safely for humans, birds and other wildlife.

Accordingly, an apparatus for exploiting wind energy in urban environments remains desirable.

SUMMARY OF THE INVENTION

The present invention is related generally to power generation, and more particularly, to an apparatus for generating power from wind energy by accelerating winds captured by a wind catcher module. According to a first aspect, a wind energy system comprises a wind turbine and a wind catch opening, in which there is a pressure-gradient force that accelerates the movement of air and sucks air into the wind catch opening and onto the wind turbine. According to another aspect, a wind energy system comprises a wind turbine and a wind catch module that redirects wind from outside the wind energy system to the wind turbine in a direction substantially perpendicular to the wind turbine. The wind catch module, along with wind guide that directs the wind towards the horizontally operating wind turbine, can capture wind blowing from all directions. According to yet another aspect, a wind energy system comprises a wind turbine, where the moving parts of the wind turbine are not exposed to humans, birds or other wildlife during normal operation.

In furtherance of these and other aspects, the wind energy system includes a wind-flow conduit that nozzles air flow from the wind catch opening to the wind turbine. Other features for accelerating air movement into the wind turbine includes a cone-shaped structure located on the back of the wind turbine that generates suction of air into the wind turbine.

In additional furtherance of the above and other aspects, an exemplary wind energy system includes a wind catch module that includes a wind guide that is constructed of a flexible material and that is substantially impermeable to wind, the wind guide redirecting wind outside the wind energy system, which may blow from all directions, to the wind turbine inside the wind energy system.

In additional furtherance of the above and other aspects, an exemplary wind energy system encloses the wind turbine such that the blades of the wind turbine are contained and cannot be accessed by humans, birds or other wildlife in normal operation.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In the following description, the terms "wind" and "moving air" will be used interchangeably.

Figure 1A:
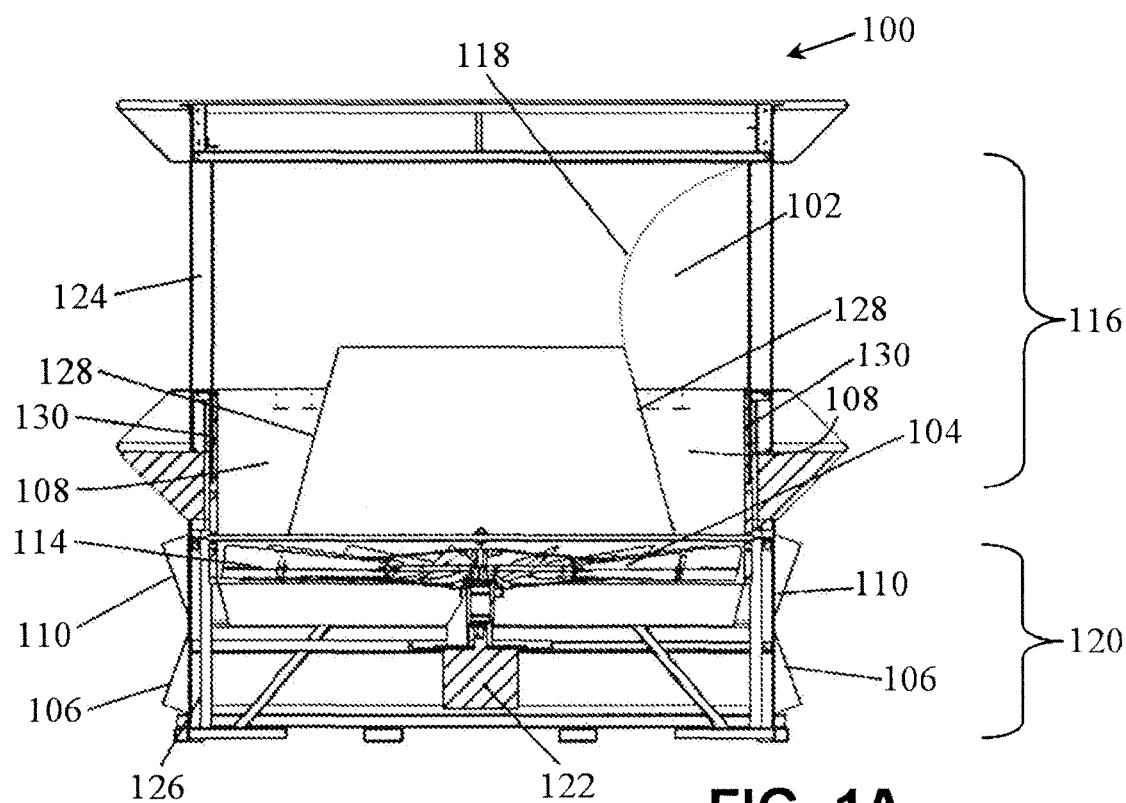
FIGS. 1A and 1B is an example of a wind energy system that implements principles of the present invention.
Figure 1B:
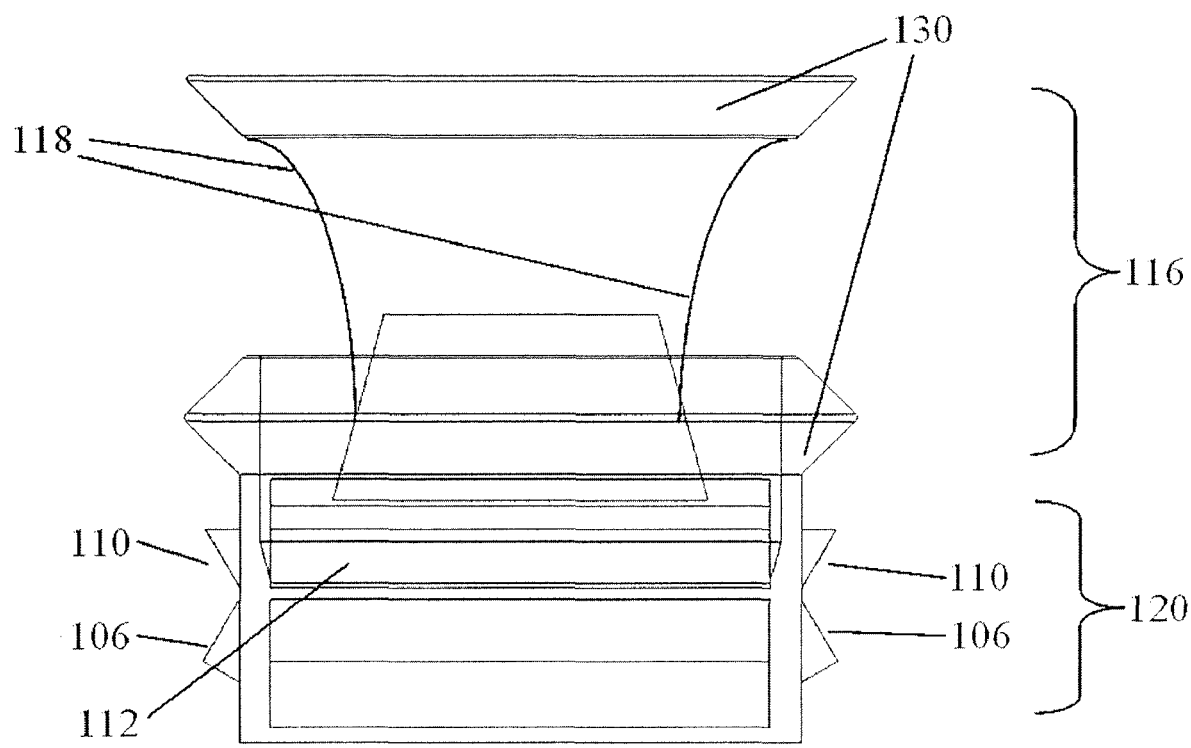

A wind energy system suitable for use in urban environments includes a wind turbine, which converts the kinetic energy in wind into mechanical energy, and a wind catch opening through which wind, or moving air, enters the wind energy system. A wind turbine is usually a rotating machine and comprises a plurality of blades oriented such that moving air striking the blades result in blade rotation, which conveys mechanical energy. Wind energy systems also often include generators that convert the mechanical energy generated by wind turbines into electricity. FIGS. 1A and 1B illustrate an example wind energy system 100 that includes wind catch opening 102 and wind turbine 104. Moving air enters wind energy system 100 through wind catch opening 102 and eventually strikes the blades of wind turbine 104 to produce mechanical energy.

In embodiments such as that shown in FIGS. 1A and 1B, system 100 substantially includes two modules, a wind catch module 116 coupled to a power module 120. Wind catch module 116 includes a wind catch opening 102, a wind guide 118, and a housing 124. Power module 120 includes wind turbine 104, wind turbine blades 114, generator 122, and frame 126. Wind power module 120 further includes wind flow conduit cone 128, wind flow conduit duct 130, cone-shape structure 112, inlets 110, and outlets 106. Wind flow conduit 108 comprises the space between wind flow conduit cone 128 and wind flow conduit duct 130. Cone-shape structure 112 is located beneath wind turbine 104. In one example embodiment, wind energy system 100 is about 10 feet tall and about 9 feet by 9 feet wide and has a footprint of about 81 square feet. In such an embodiment, system 100 is preferably capable of generating, on average, about 900 KWhr per month in winds of 16-18 mph or greater, or about 10,800 KWhr per year.

In the wind catch module 116, the housing 124 is preferably comprised of steel fiber glass or other suitable structural materials about 0.125" mils thick (for example, L section or I beams or other structural shapes). Housing 124 can include lattice screens in areas of opening 102, through which wind passes but which prevents humans, birds and similar sized or larger wildlife from entering the wind turbine. More particularly, FIG. 7C depicts an example of an embodiment of a lattice screen 706, which is constructed from steel or other suitable fence material with at least 95% of the screen being open (for example, fencing material that is used to secure perimeter).

Wind guide 118 is comprised of a flexible material that is substantially impermeable to wind, such as plastic, sail or parachute material. In a preferred embodiment, the material of choice for the wind guide is Norlon 150. According to aspects of the invention, wind guide 118 is constructed such that when wind catch module 116 is mounted onto power module 120, wind enters power module 120 through wind catch opening 102 by striking wind guide 118. More particularly, FIG. 7B depicts an example of an embodiment of a wind guide 704, which is constructed from plastic (e.g., Norlon 150) about 150 mils thick. Wind guide 704 is a tube of Norlon 150 that is 12 feet in diameter and 6 feet tall. Wind guides such as wind guide 704 flexes in response to wind, thereby capturing incoming wind from any direction and guiding the wind down towards the wind turbine. The wind guide 118 also prevents incoming wind from escaping the wind energy system by sealing off directions other than the direction toward the wind turbine.

As shown in FIG. 1B, wind catch module 116 further comprises two wind catch lips 130 on each side of the wind energy system on the top and bottom of wind catch opening 102. The wind catch lips 130 extend 1.5' beyond the frame and bring the tip to tip dimension of the system to 11' long.

In power module 120, frame 126 is comprised of welded steel structural sections or bolted fiberglass L shaped rods about 0.125 mils thick such as external fiber glass 2"×2"× 0.125" thick or similar steel or other structural materials and components. In one possible example implementation, wind turbine 104 can be a commercially-available wind turbine such as Dempster 8' diameter wheel made by Dempster Industries LLC in Beatrice, Nebr. In general, wind turbine 104 can be constructed from steel, carbon fiber, or fiber glass materials for effective conversion of wind speed kinetic energy to torque for turning the turbine. The wind turbine may be 8' in diameter, with 160 lbs of weight mounted on a drive system to run smoothly when wind runs through it. Wind turbine 104 comprises blades 114, which may range from 15 to 25 in number. Blades 114 may, for example, be comprised of steel, fiber glass, or carbon fiber materials about 4' long. It should be noted that other wind energy systems according to embodiments of the invention may include larger wind turbines located in larger frames, and wind energy systems are not limited to any particular size.

Figure 7A:
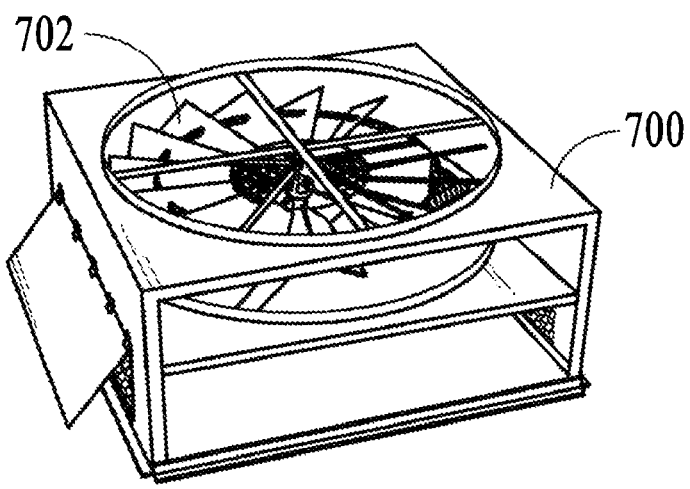
FIGS. 7A, 7B, and 7C depict example embodiments of a power module, a wind guide, and a wind catch module screen.
Figure 7B:
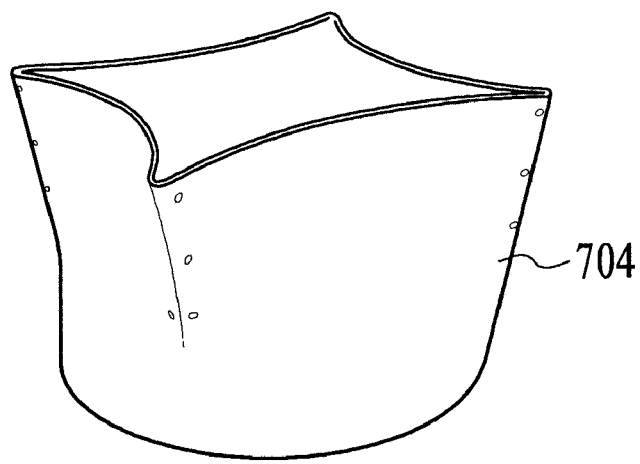
Figure 7C:
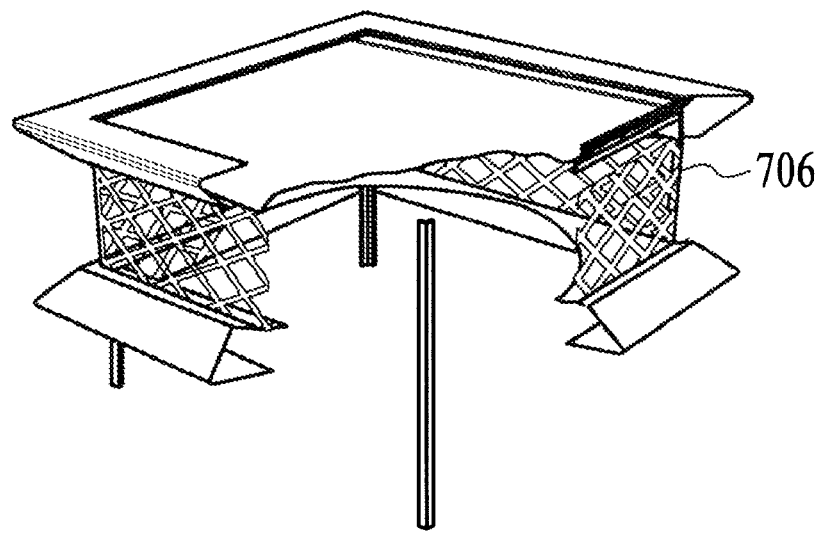

FIG. 7A depicts an example of a power module 700 that includes wind turbine 702. According to aspects of the invention, wind turbine 702 is mounted within power module 700 such that the blades lie in a substantially horizontal plane.

Returning to FIG. 1, power module 120 includes wind flow conduit cone 128 that is coupled to wind guide 118 and is comprised of a material such as Norlon 150 about 0.015" thick. Wind flow conduit cone 128 is constructed to slope such that the wind flow conduit 108, consisting of the space between the wind flow conduit cone 128 and wind flow conduit duct 130, is shaped to have a bigger opening near the wind catch opening 102 and a smaller opening near the wind turbine 104. From a top view, wind flow conduit 108 is a ring-shaped conduit where the wind flow conduit cone 128 comprises the inner radius of the ring and the wind flow conduit duct 130 comprises the outer radius of the ring.

Figure 8:
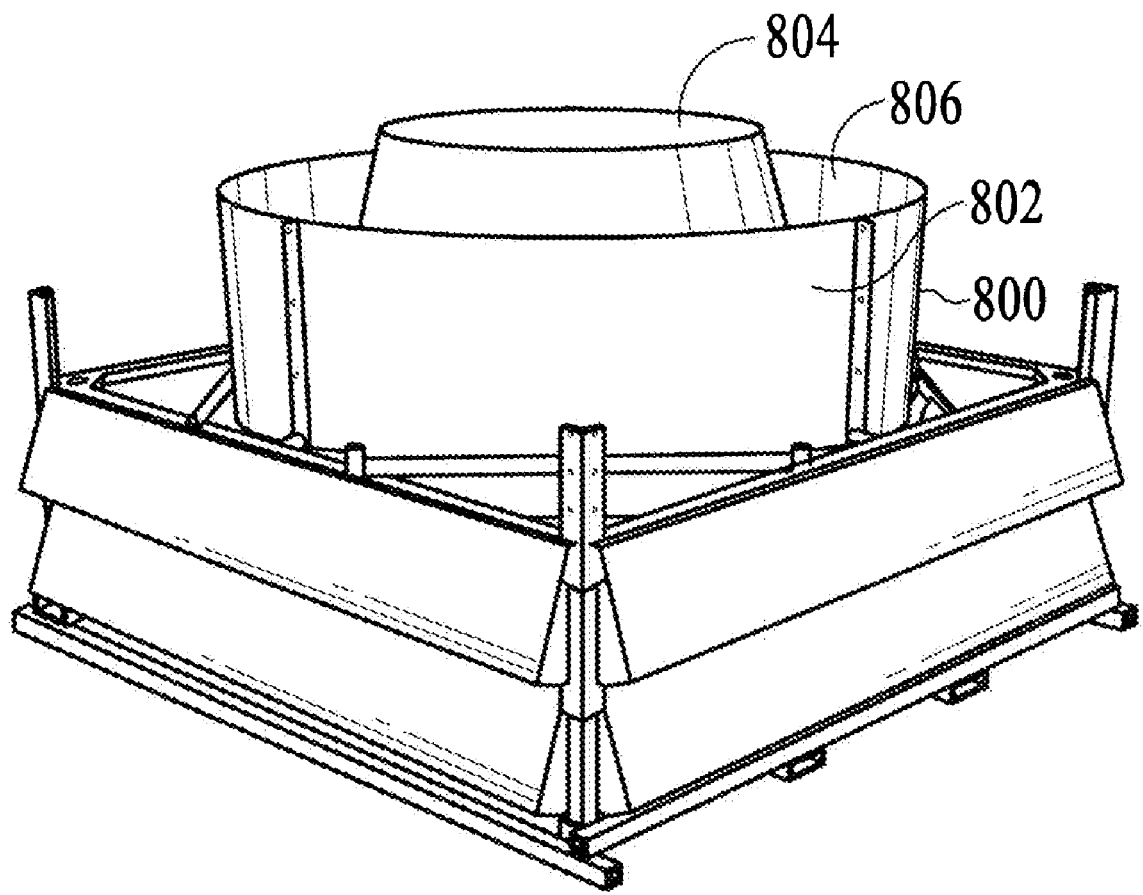
FIG. 8 illustrates an example embodiment of a power module.

More particularly, FIG. 8 illustrates an example embodiment of a power module 800 that includes wind flow conduit duct 802 and wind flow conduit cone 804. Wind flow conduit 806 comprises the space between wind flow conduit cone 804 and wind flow conduit duct 802. Wind flow conduit cone 804 is a truncated cone, and may be constructed from sheet metal steel or fiber glass. In an example, wind flow conduit cone 804 is dimensioned to be about 0.030 thick and 3' high with a 6' base. Wind flow conduit duct 802 may be constructed from sheet metal steel and dimensioned to fit over the wind turbine below it (not explicitly depicted). Wind flow conduit duct 802 may have a diameter of 8'. Wind flow conduit 806 is thus a ring-shaped conduit whose cross-section area decreases from top to bottom as wind flow conduit cone 804 slopes downward to decrease the cross-section area between wind flow conduit cone 804 and wind flow conduit duct 802. Where wind flow conduit cone 804 is constructed to have a 6' base and wind flow conduit duct 802 is constructed to have an 8' diameter, the cross-section of wind flow conduit 806 at the bottom (near the wind turbine) comprises an annular ring with a width of 1'. Wind flows downward through wind flow conduit 806 before reaching the wind turbine inside power module 800 (not explicitly depicted but located below the wind flow conduit 806).

Returning to FIG. 1, a cone-shaped structure 112 is constructed to be located below the wind turbine 104. The cone-shaped structure 112 is comprised of, for example, steel sheet metal. According to one embodiment, cone-shaped structure 112 is attached to wind flow conduit duct 130, and is dimensioned to reduce from a larger diameter (for example, 8') to a smaller diameter (for example, 6') with a gentle slope.

Wind turbine 104 is connected to generator 122. Generator 122 can be implemented by a commercially-available generator, such as a PMG-5K from Ginlong Technologies located in Ningbo, Zhejiang in the People's Republic of China.

Power module 120 further comprises inlets 110 and outlets 106. The inlets 110 may range from 4 to 8 in number, and the outlets may range from 4 to 8 in number. Generally, wind exits wind energy system 100 through outlets 106. Wind may enter or exit wind energy system 100 through inlets 110. An inlet 110 lets in wind when it is facing the direction of the prevailing wind but lets out wind when it is in the opposite direction of the prevailing wind. For example, if the prevailing wind is northerly, wind enters wind energy system 100 through inlet(s) 110 located on the north side of the wind energy system 100 and exits from inlet(s) 110 that are located on other sides of the wind energy system 100. In other words, when an inlet 110 is not facing the prevailing wind, it is an exhaust through which wind exits. As the direction of the prevailing wind changes, different inlet(s) 110 become exhausts. Generally, inlets 100 and outlets 106 are dimensioned such that the total area through which wind enters the system (including the wind catch opening 102 and any inlets 110 through which wind enters) is smaller than the total area through which wind exits the system (including outlets 106 and any inlets 110 through which wind exits).

Figure 9:
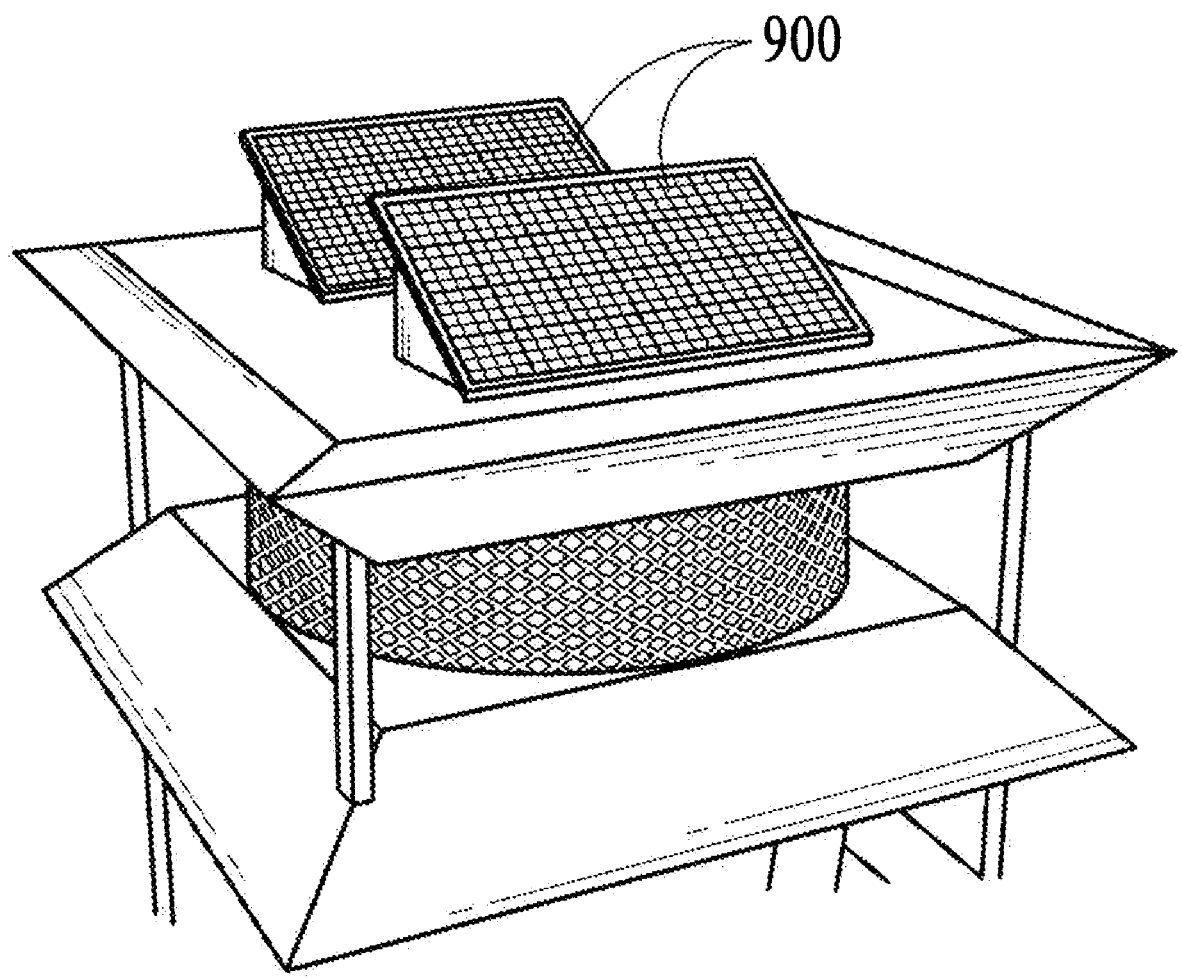
FIG. 9 illustrates an example embodiments where solar power panels are installed on top of wind energy system.

In one embodiment, wind energy system 100 may further comprise solar panels, such as solar panels 900 in FIG. 9, which generate power for the power electronics and control systems of the wind energy system 100. According to one embodiment, DC electricity generated by the solar panels may be converted to AC electricity (e.g., 50 Hz or 60 HZ AC electricity) by an inverter before being used for wind energy system 100's power electronics. Alternatively, the DC electricity may be directly used by some or all of wind energy system 100's power electronics.

Wind is often turbulent and moves in a random fashion, especially on roof tops of urban buildings. According to aspects of the invention, therefore, to facilitate wind catching by the wind energy system, the wind energy system is constructed such that there is a pressure-gradient force that sucks in the prevailing winds, such as wind on the roof top of buildings, and accelerates the intake of wind at the wind catch opening (e.g., wind catch opening 102), allowing the wind energy system to better catch turbulent winds. In other words, a pressure-gradient in the wind energy system creates suction at the wind catch opening to accelerate the entrance of wind into the wind energy system and more specifically, to the wind turbine.

Although wind energy systems with pressure-gradient forces are best suited for environments with turbulent winds, such wind energy systems may also be employed in environments with prevailing winds to accelerate the intake of prevailing winds.

In one approach, a wind energy system includes a wind flow conduit that conducts the moving air that has entered the wind energy system through the wind catch opening to the wind turbine, in which the opening of the wind flow conduit near the wind catch opening is larger than the opening of the wind flow conduit near the wind turbine. An example of such a wind flow conduit is wind flow conduit 108 in FIG. 1. Wind flow conduit 806 in FIG. 8 also depicts such a wind flow conduit. Such a wind flow conduit accelerates the air moving through it by increasing the air's speed. The air's speed is increased due to the throttling, or nozzling, effect created by the wind flow conduit's exit opening (i.e. the opening near the wind turbine) being smaller than the wind flow conduit's entrance opening (i.e. the opening near the wind catch opening). For example, as wind moves down through wind flow conduit 806, wind flow conduit duct 802 guides the wind over the wind turbine and the wind flow conduit cone 804 increases the wind speed by reducing the cross section of the turbine from a larger ring-shaped opening to a smaller ring-shaped opening. This results in increased mass flow rate of the wind that increases the movement of air from the wind catch opening to the wind turbine. Furthermore, the increase in wind speed compensates for any decrease in wind speed experienced by the wind as it entered the wind energy system (e.g., a decrease in wind speed resulting from the wind's changing of direction after striking wind guide 118). In addition, the increase in the air's speed effectively results in a more energetic flow of wind mass striking the blades of the wind turbine, which in turn results in a higher rate of conversion from kinetic energy to mechanical energy at the wind turbine. Finally, the wind flow conduit also provides the benefit of smoothing out random winds.

In another approach, the wind energy system further comprises an inlet and a cone-shaped structure. An example of an inlet and a cone-shaped structure is inlet 110 and cone-like structure 112 in FIG. 1. Cone-shaped structure 112 may be attached to wind flow conduit duct 130 and located beneath wind turbine 104 such that wind flowing down wind flow conduit 108 strikes wind turbine 104 before continuing to flow down cone-shaped structure 112. Cone-shaped structure 112 together with inlets 110 form a passive suction system driven by outside wind. As the prevailing wind rushes towards the wind energy system 100, a portion of the wind that does not go into the wind catch opening 102 enters wind energy system 100 through an inlet 110 that is facing the prevailing wind. The wind then flows downwards through the space between frame 126 and cone-shaped structure 112 to exit through outlets 106. At the same time, wind flowing through wind turbine 104 is also flowing out from the bottom of cone-shaped structure 112. As a result, a Venturi effect is created, producing suction below wind turbine 114 and in effect increasing the speed of air moving through wind turbine 114. In one embodiment, blowers may be used to produce moving air to create or assist the Venturi effect. The blowers may be powered, for example, by solar panels or by power from the power grid to which the wind energy system is attached.

In this approach, the cone-like structure is located on the back of the wind turbine such that the prevailing wind that enters through inlet 110 causes suction to be created on the back of the wind turbine. This suction accelerates the movement of air through the cone-like structure and also effectively accelerates the movement of air through the wind turbine, thereby accelerating wind flow to the wind turbine and increasing the amount of energetic wind molecules that are exposed to the wind turbine. The increase in wind flow rate results in an increase in the amount of energy converted by the wind turbine, ultimately increasing the electricity produced by the wind energy system significantly over non-accelerated systems. In addition, since wind exiting cone-shaped structure 112 is diverted to exit wind energy system 100 through outlets 106 and other inlets 110 that are opposite from the direction of the prevailing wind, exiting winds are effectively accelerated. The acceleration of exiting winds helps to speed up the exit of spent winds from wind energy system 100, thereby clearing up space for new energetic wind to enter the wind energy system.

Figure 2:
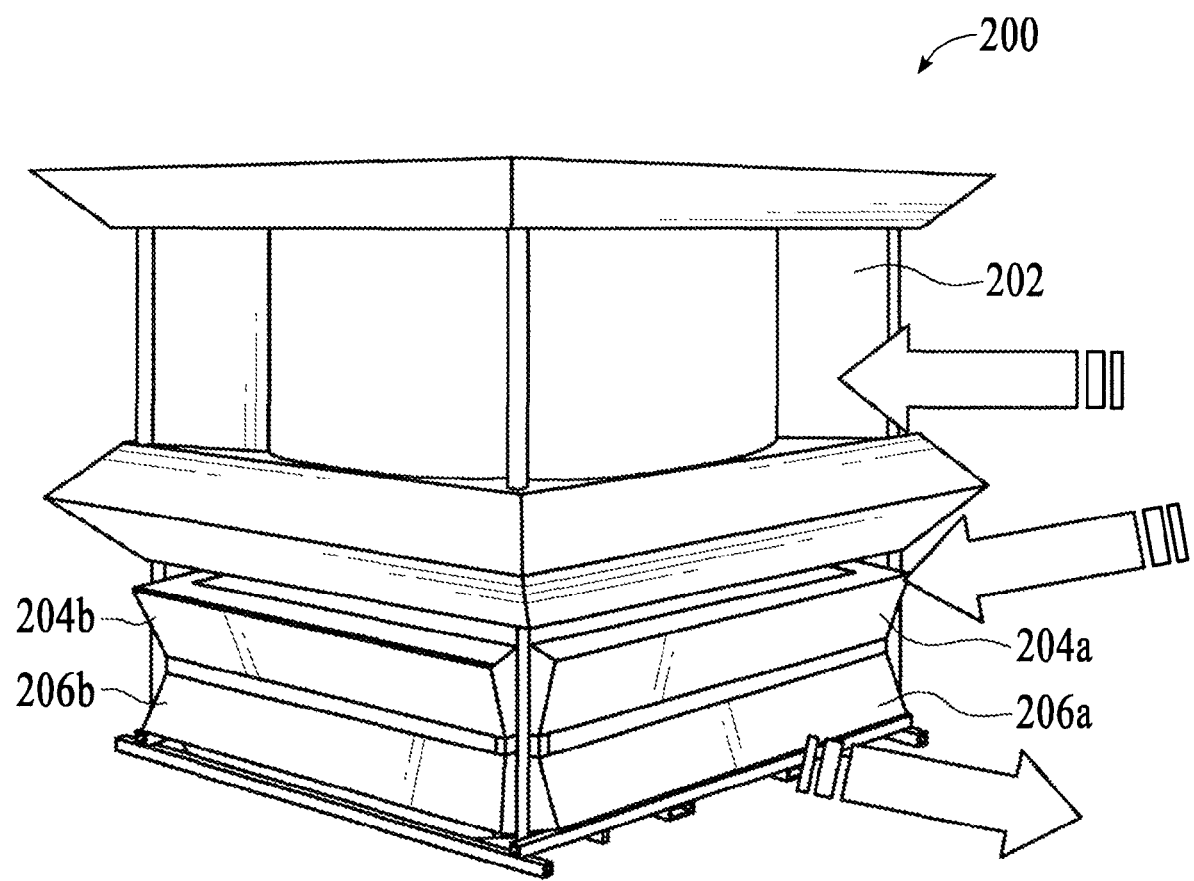
FIG. 2 depicts the air flow through a wind energy system.

In one approach, the wind energy system comprises one or more outlets through which air exits the wind energy system and one or more inlets through which air enters the wind energy system, in which the total surface area of the outlets is larger than the total surface area of inlets in the wind energy system. Used generally, "inlets" comprise both wind catch opening 102 and inlets 110 in FIGS. 1A and 1B. An example of an outlet is outlet 106 in FIG. 1. An inlet 110 may also act as an outlet when it is on the opposite side of the prevailing wind. When the outlets in total are bigger than the inlets in total, air exits the wind energy system faster, resulting in efficient exhaust of spent wind and ensuring that there is no impediment to wind entering the wind energy system. For example, FIG. 2 illustrates a wind energy system 200 that comprises wind catch opening 202, inlets 204a and 204b, and outlets 206a and 206b. Wind energy system 200 may also comprise additional inlets and outlets (not depicted) on opposing sides from inlets 204a and 204b and outlets 206a and 206b. In an example, the prevailing wind blows toward wind energy system 200 such that wind enters through wind catch opening 202 and inlet 204a. Inlet 204b, which does not face the direction of the prevailing wind, acts as an outlet through which exhaust winds from within wind energy system 100 exits. Exhaust wind also exits through outlets 206a and 206b. When wind energy system 100 is constructed such that the total area of wind catch opening 202 and inlet 204a is smaller than the total area of inlet 204b, outlets 206a and 206b, and any other outlets that are not explicitly depicted, then wind can exhaust from wind energy system 100 faster than wind enters wind energy system 100. As a result, wind flow into and through wind energy 100 is fast and unimpeded.

Figure 3:
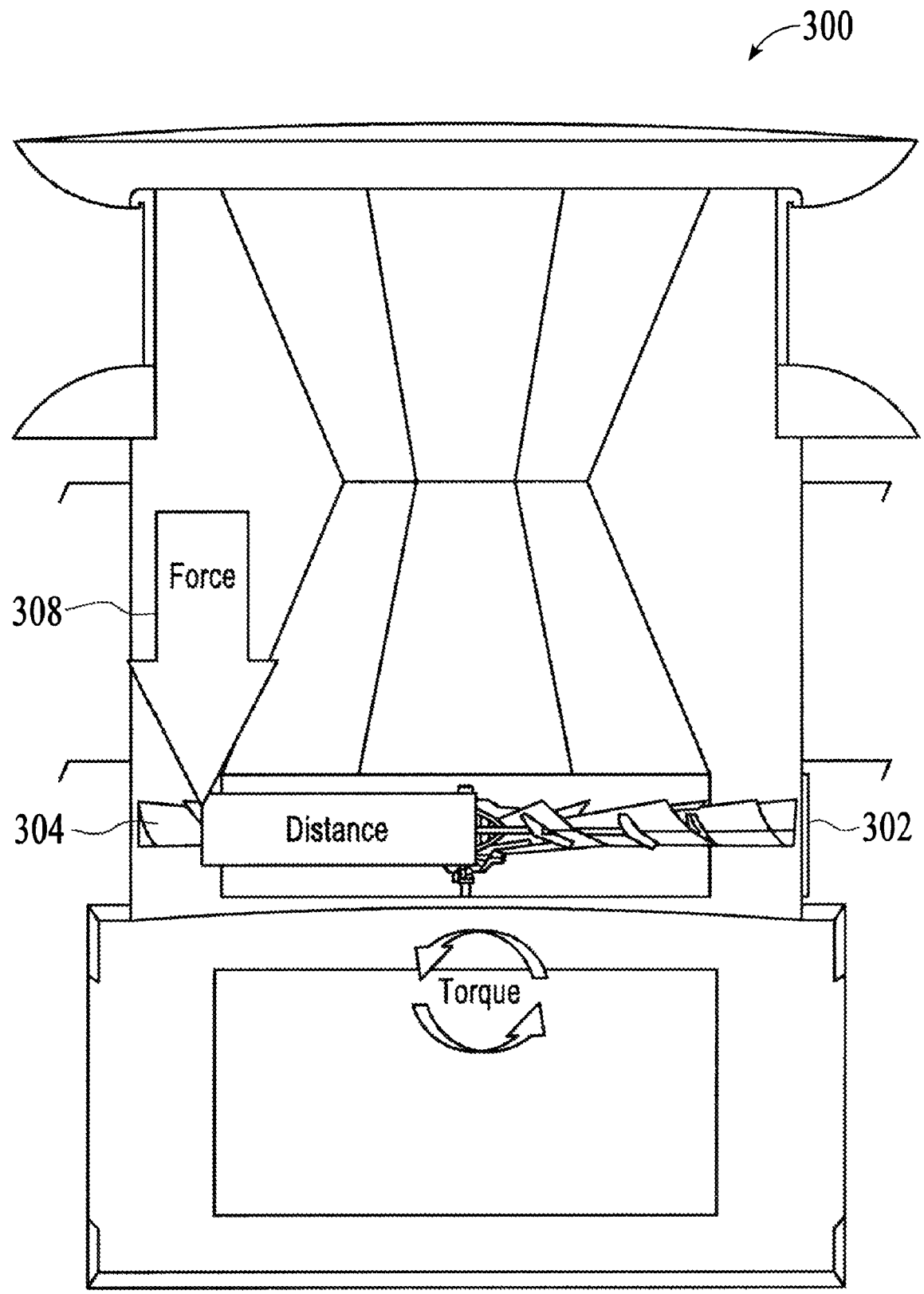
FIG. 3 depicts the air flow in a wind energy system with respect to a wind turbine in the wind energy system.

In one approach, wind that enters the wind energy system is conveyed to the wind turbine in such a manner that the concentrated fast wind initially only strikes a portion of the blades in the wind turbine instead of the entirety of the blades. For example, FIG. 3 illustrates a wind energy system 300 that comprises wind turbine 302. Wind turbine 302 in turn comprises blade 304. Arrow 306 represents the direction of wind flow in wind energy system. As illustrated in FIG. 3, concentrated fast wind flow is constricted such that the wind, when striking blade 304, actually only strikes a small portion of the outer surface of the turbine blade 304 at the edge. Striking blade 304 only at a small portion at the edge results in more torque due to concentration of the wind force at the long moment arm on the outermost length of the blades. This procures more torque than striking the entirety of blade 304. The increased torque in turn results in a higher conversion rate of kinetic energy to mechanical energy at the wind turbine.

In this approach, a wind flow conduit may be used to conduct air to the wind turbine such that the conducted air initially strikes only a portion of a blade in the wind turbine. This wind flow conduit may be the same as the wind flow conduit, described above, that nozzles the wind that entered through the wind catch opening. Wind flow conduit 108 in FIG. 1 is one such conduit. Wind flow conduit 108 nozzles the wind that entered through wind catch opening 102 and at the same time, conducts the wind such that the wind initially strikes only the outermost portion of the turbine blades (e.g., blade 114) in wind turbine 104. According to one embodiment, air initially strikes only the outermost length of a blade whose moment arm is about 4' from the center of wind turbine 104 creates about 175% more energy. Other embodiments may apply wind to different percentages of the wind turbine blades.

Wind in urban environments is often turbulent and random. To facilitate energy conversion by the wind energy system, the wind energy system is constructed such that turbulent wind, after entering the wind energy system, is redirected to move substantially perpendicularly with respect to the wind turbine inside the wind energy system. In other words, wind from different directions is redirected to strike the wind energy system's wind turbine in a direction that is favorable to the operation of the wind turbine in converting the kinetic energy in wind to mechanical energy.

In one approach, the wind energy system comprises a wind catch module, which in turn comprises a wind catch opening through which wind enters the wind energy system. One example of a wind catch module is wind catch module 116 in FIG. 1. Wind catch module 116 comprises wind catch opening 102 and redirects wind entering 102 to move substantially perpendicularly with respect to wind turbine 104. Another advantage of such a configuration is that the wind turbine in a wind energy system can be placed at the most suitable location on the rooftop of a building regardless of the direction of the prevailing wind. Whether or not the wind catch module in the wind energy system is placed at the location with favorable winds, the winds can enter the wind energy system and then be redirected to the wind turbine for energy conversion.

Wind catch module 116 may additionally comprise wind guide 118, which is constructed of a flexible material that is substantially impermeable to wind. Wind guide 118 is located such that wind entering the wind catch module 116 strikes wind guide 118 before striking wind turbine 104. Because wind guide 118 is both flexible and does not let wind pass through, when wind strikes wind guide 118, the wind is directed downwards towards wind turbine 104, in a substantially perpendicular direction.

Figure 4:
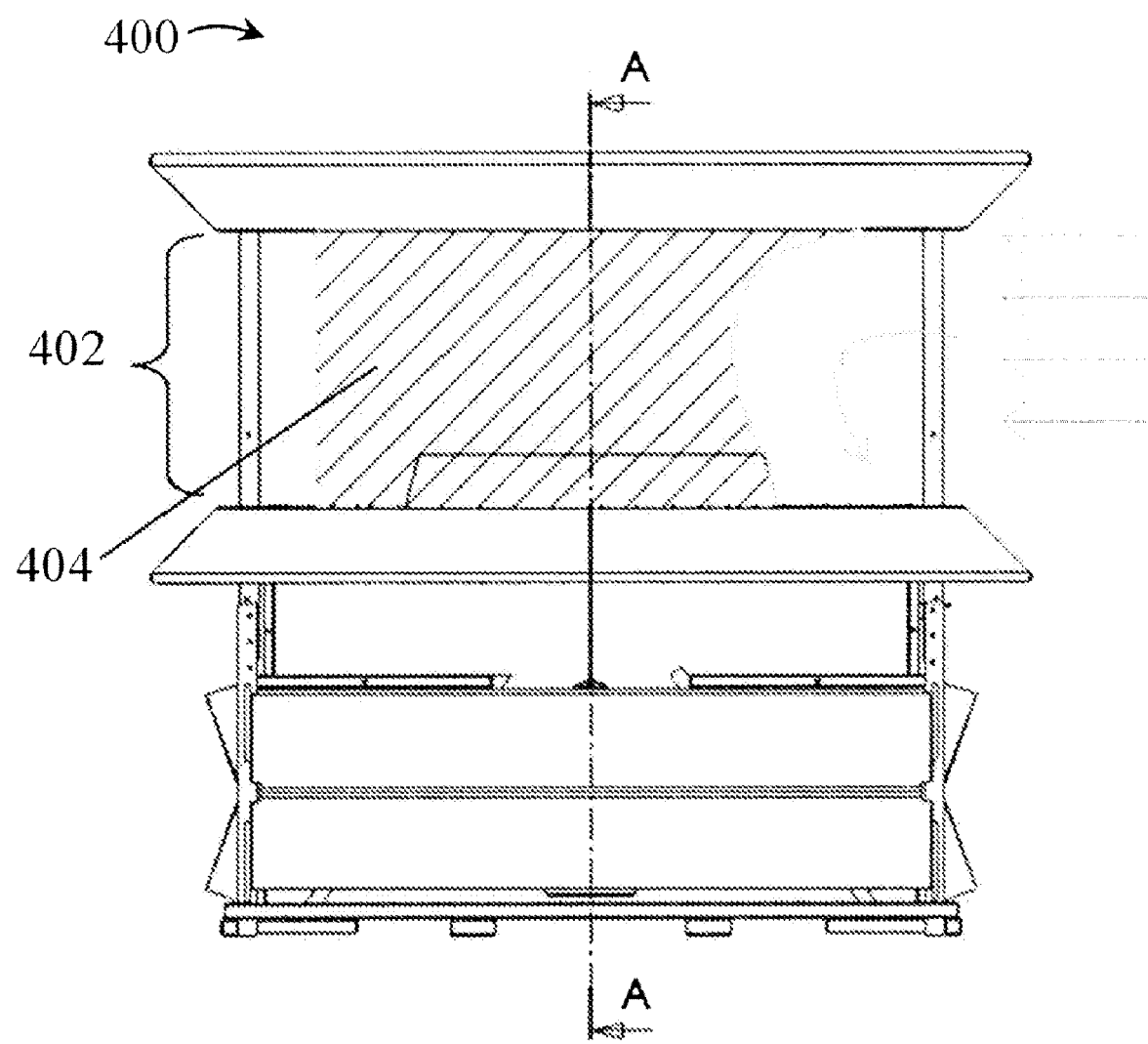
FIG. 4 depicts an example of a wind energy system that includes a wind catch module and a wind guide.

Wind guide 118 may be constructed such that it is capable of redirecting winds from different directions. Moreover, wind catch module 116 may be open from all directions, thereby guiding wind from all directions to the wind turbine below. As wind guide 118 guides wind coming from one direction, it also seals the other sides so that incoming wind does not escape in the other directions and is directed downward to the wind turbine. In FIG. 4, the wind guide is experiencing wind from the right side and has flexibly bent in response to the wind, thereby directing the wind downward. In such a manner, turbulent wind that are from various directions is directed to flow in a direction that is favorable to the efficient conversion of energy in the wind energy system. Smooth laminar flowing wind can also be effectively captured according to this approach. An advantage of such an omni-directional wind energy system is that the wind energy system can be placed on building roof tops in any preferred orientation to accommodate for the physical demands of the buildings.

In one approach, the wind turbine in the wind energy system starts and brakes with a generator in the wind energy system via electronics such that the rate at which the power is pulled from the generator increases or reduces the torque that is demanded from the turbine. In this manner, the turbine in a runaway storm situation, for example, can be slowed by the power electronics drawing power at a faster rate. The wind turbine may be further outfitted with a mechanical brake to slow down the wind turbine in high-wind situations. Finally, the wind energy system may be constructed such that when winds reach a particular speed, wind guides in the wind energy system (i.e. wind guide 118) is pulled up so that wind passes through the wind energy system without reaching the wind turbine. In such a manner, damage to the wind turbine due to excessively high winds may be averted. According to one embodiment, the wind energy system may include an anemometer for detecting wind speed and pulleys for pulling up the wind guide when a particular speed is detected by the anemometer.

Often, the initial energy needed to overcome the inertia of a stationary wind turbine is high compared to energy needed to increase the speed of an already-turning wind turbine. Therefore, according to one approach, the wind turbine in the wind energy system may be supplied with controls and power for turning the wind turbine at a certain speed (RPM). The power may be supplied from the power grid to which the wind energy system is attached or from solar panels installed on the wind energy system.

In urban environments, it is important for a wind energy system to be safe. For example, the wind energy system may be installed on the rooftop of a building where humans, birds and other wildlife may come into contact with the wind energy system. Traditional wind energy systems contain exposed wind turbines whose fast-moving blades may be dangerous to humans, birds and other wildlife. As such, according to one embodiment, a wind energy system comprising a wind turbine is constructed to enclose the wind turbine such that no moving parts of the wind turbine are exposed to humans, birds or other wildlife during normal operation of the wind energy system. The blades of the wind turbine in such a wind energy system, for example, may be contained in enclosure that prevents access by humans, birds and other wildlife.

Figure 5:
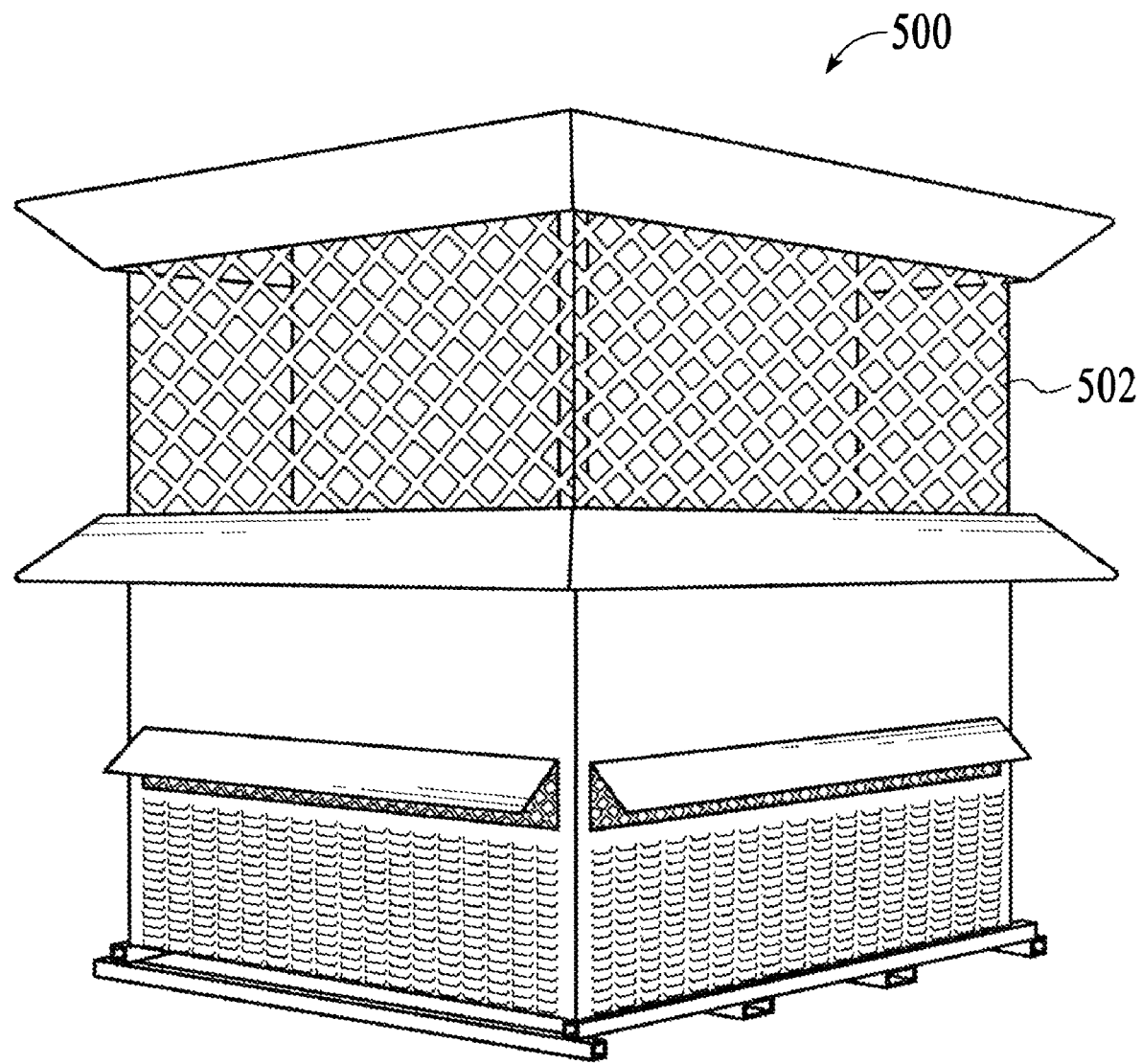
FIG. 5 depicts an example wind energy system constructed according to an embodiment of the present invention.
Figure 6A:
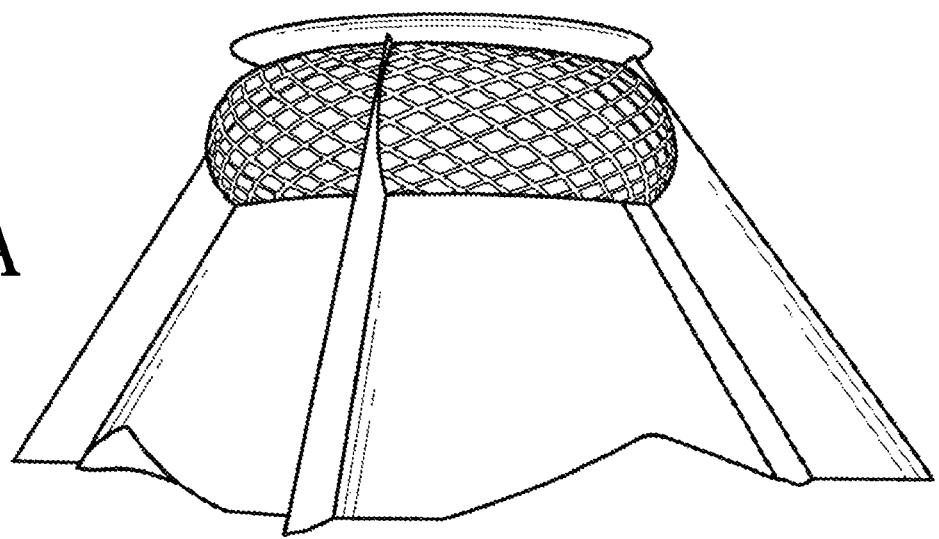
FIGS. 6A and 6B illustrates an alternative embodiment of a wind energy system to that shown in FIG. 5.
Figure 6B:
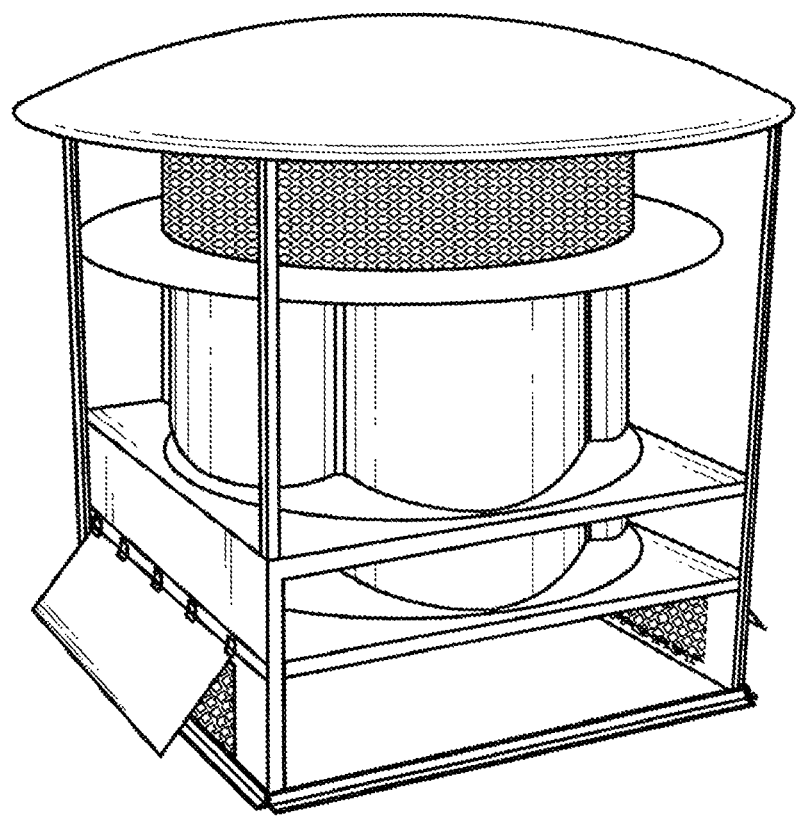

For example, FIG. 5 illustrates an example wind energy system 500, in which the moving parts of the wind turbine are not exposed to or accessible by humans or birds in normal operation. Wind energy system includes a lattice, or mesh, that lets wind through but keeps out humans and birds. The lattice or mesh may be made of fence material constructed of steel wires creating more than 95% or better opening for the wind to get through. FIGS. 6A and 6B illustrate alternative embodiments of a wind energy system to that shown in FIG. 5. The percentage of opening (e.g., 95%) may determine the right mesh size and opening pattern for the material of construction.

In one approach, wind energy systems are regulated, conditioned and certified for power utilities so that the wind energy systems can plug right into the electrical system of the building, thereby reducing the net energy usage for the house or building where the wind turbine is installed. Energy generated by the wind energy systems that is in excess of the usage by the buildings on which the wind energy systems are installed can further be redirected onto the power grid and sold back to the power utilities. The wind energy system may be designed for and used on both residential and commercial buildings. In one embodiments the wind energy system further includes a power electronics systems that allows it to tie in directly to the grid of the building in which the wind energy system is being installed, thereby providing plug-and-play convenience for the user.

Wind energy systems may be designed to be permit ready and to mount much like a commercial air-conditioning (AC) unit, thereby reducing installation time, cost, and effort. System format, contained turbines, safety, and use of approved power electronics is the key for this similarity and approval process. With only a 10' height the wind energy system described here fits well within the requirements of most municipalities in the urban environments as well as the safety of not exposing any of its moving turbine parts to people or aviaries and use of approved and safe power electronics makes the plug and play capability of simply connecting to the building grid an easy and approved way to connect the generated power to the demand lines.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A wind energy system comprising:
   a wind catch opening through which air enters the wind energy system; and
   a wind turbine;
   wherein air entering the wind catch opening is accelerated by a pressure-gradient force to the wind turbine,
   the wind energy system further comprising:
   an inlet through which air enters the wind energy system;
   an outlet through which air exits the wind energy system; and
   a cone-shaped structure located below the wind turbine, wherein a top opening of the cone-shaped structure that receives air flowing from the wind turbine is larger than a bottom opening of the cone-shaped structure;
   wherein the air received from the wind turbine and flowing from the top opening of the cone-shaped structure to the bottom opening of the cone-shaped structure is mixed with air that entered through the inlet before the mixed flows of air exit through the outlet.

2. A wind energy system according to claim 1, wherein the wind turbine is in a substantially horizontal plane.

3. A wind energy system according to claim 1, further comprising:
   a wind flow conduit that conducts air from the wind catch opening to the wind turbine, wherein an opening of the wind flow conduit near the wind catch opening is larger than an opening of the wind flow conduit near the wind turbine.

4. A wind energy system according to claim 1, wherein:
   air flowing from the top opening of the cone-shaped structure to the bottom opening of the cone-shaped structure is accelerated by the Venturi effect.

5. A wind energy system according to claim 4, wherein air is sucked through the wind turbine and into the cone-shaped structure.

6. A wind energy system according to claim 1, wherein:
   a surface area of an opening of the outlet is equal to or larger than a surface area of the wind catch opening at an entrance of the wind energy system.

7. A wind energy system according to claim 1, further comprising a wind catch module that comprises the wind catch opening, the wind catch module redirecting moving air outside the wind energy system to the wind turbine inside the wind energy system such that the redirected moving air moves substantially perpendicularly with respect to the wind turbine.

8. A wind energy system according to claim 1, wherein the wind turbine is enclosed such that moving parts of the wind turbine are not exposed to humans, birds or similar sized and larger wildlife during normal operation of the wind energy system.

9. A wind energy system according to claim 8, wherein blades of the wind turbine are located within a contained enclosure.

10. A wind energy system according to claim 1, further comprising a wind flow conduit that conducts air to the wind turbine such that the conducted air initially strikes only a portion of a blade in the wind turbine.

11. A wind energy system according to claim 1, further comprising a generator that converts mechanical energy generated by the wind turbine into electricity, wherein the wind turbine starts and brakes with the generator such that an increase in power drawn from the generator leads to an increase in torque demanded from the wind turbine.

12. A wind energy system comprising:
  a wind turbine; and
  a wind catch module that redirects moving air outside the wind energy system to the wind turbine inside the wind energy system such that the redirected moving air moves substantially perpendicularly with respect to the wind turbine,
  wherein:
    the wind catch module comprises a wind catch opening through which air enters the wind energy system; and
    air entering the wind catch opening is accelerated by a pressure-gradient force to the wind turbine,
  the wind energy system further comprising:
    an inlet through which air enters the wind energy system;
    an outlet through which air exits the wind energy system; and
    a cone-shaped structure located below the wind turbine, wherein a top opening of the cone-shaped structure is larger than a bottom opening of the cone-shaped structure;
    wherein the air that is received from the wind turbine and flowing from the top opening of the cone-shaped structure to the bottom opening of the cone-shaped structure is mixed with air that entered through the inlet before the mixed flows of air exit through the outlet.

13. A wind energy system according to claim 12, wherein the wind catch module comprises a wind guide that redirects moving air outside the wind energy system to the wind turbine inside the wind energy system such that the redirected moving air moves substantially perpendicularly with respect to the wind turbine, the wind guide being constructed of a flexible material that is substantially impermeable to the moving air.

14. A wind energy system according to claim 12, wherein the wind turbine is in a substantially horizontal plane.

15. A wind energy system according to claim 12, further comprising:
  a wind flow conduit that conducts air from the wind catch opening to the wind turbine, wherein the opening of the wind flow conduit near the wind catch opening is larger than the opening of the wind flow conduit near the wind turbine.

16. A wind energy system according to claim 12, wherein a surface area of an opening of the outlet is larger than a surface area of the wind catch opening at an entrance of the wind energy system.

\* \* \* \* \*